US008726832B2

(12) United States Patent
Krogedal et al.

(10) Patent No.: US 8,726,832 B2
(45) Date of Patent: *May 20, 2014

(54) PAINTING SYSTEM HAVING A WALL-MOUNTED ROBOT

(75) Inventors: Arnulf Krogedal, Sandnes (NO); Gisle Bryne, Bryne (NO)

(73) Assignee: ABB AS, Billingstad (NO)

( * ) Notice: Subject to any disclaimer, the term of this patent is extended or adjusted under 35 U.S.C. 154(b) by 324 days.

This patent is subject to a terminal disclaimer.

(21) Appl. No.: 12/203,641

(22) Filed: Sep. 3, 2008

(65) Prior Publication Data

US 2009/0007844 A1    Jan. 8, 2009

Related U.S. Application Data

(62) Division of application No. 10/893,222, filed on Jul. 19, 2004, now Pat. No. 7,429,298.

(60) Provisional application No. 60/487,940, filed on Jul. 18, 2003.

(51) Int. Cl.
  *B05B 3/00*  (2006.01)
  *B05B 15/12*  (2006.01)

(52) U.S. Cl.
  USPC .............. 118/323; 118/326; 118/321; 901/43

(58) Field of Classification Search
  USPC ......... 118/323, 321, 326, 309, 313–316, 634, 118/DIG. 7; 901/43, 27, 29, 41; 427/427.2, 427/427.3; 74/490.04; 700/245
  See application file for complete search history.

(56) References Cited

U.S. PATENT DOCUMENTS

| 4,614,300 A | 9/1986 | Falcoff |
| 4,630,567 A | 12/1986 | Bambousek et al. |
| 4,668,146 A | 5/1987 | Ageta |
| 4,714,044 A | 12/1987 | Kikuchi et al. |
| 4,784,010 A | 11/1988 | Wood et al. |

(Continued)

FOREIGN PATENT DOCUMENTS

| DE | 33 01 022 A1 | 7/1984 |
| DE | 693 21 617 T2 | 4/1999 |

(Continued)

OTHER PUBLICATIONS

Commissioner for Patents, Ex Parte Reexamination Communication Transmittal Form, Reexamination Control No. 90/020,002, Patent No. 7429298, Mailed: Jun. 25, 2012.

(Continued)

*Primary Examiner* — Yewebdar Tadesse
(74) *Attorney, Agent, or Firm* — Paul R. Katterle; Melissa J. Szczepanik

(57) ABSTRACT

A painting system having a painting robot with a stationary base mounted to a wall of a paint booth in cantilever fashion. A stand is mounted to the stationary base and is rotatable around a first axis that is disposed substantially horizontal. A first arm is rotatably mounted to the stand around a second axis, and a second arm is rotatably mounted to the first arm around a third axis. The second arm is operable to rotate around the third axis 180 degrees relative to the first arm. An end effector is connected between the second arm and a painting tool. The end effector is operable to orient the painting tool.

15 Claims, 4 Drawing Sheets

(56) References Cited

U.S. PATENT DOCUMENTS

| | | | |
|---|---|---|---|
| 4,812,104 A | | 3/1989 | Suzuki |
| 4,919,967 A | | 4/1990 | Handke et al. |
| 5,014,644 A | * | 5/1991 | Yamamoto et al. ........... 118/314 |
| 5,079,822 A | | 1/1992 | Arai et al. |
| 5,103,761 A | | 4/1992 | Ishibashi et al. |
| 5,127,363 A | | 7/1992 | Nakamura et al. |
| 5,213,620 A | | 5/1993 | Meyer |
| 5,240,745 A | | 8/1993 | Yamamoto et al. |
| 5,497,674 A | * | 3/1996 | Inada ........................ 74/490.03 |
| 5,733,374 A | | 3/1998 | Ekenberg |
| 5,876,803 A | | 3/1999 | Hissen et al. |
| 5,949,209 A | | 9/1999 | Okamoto et al. |
| 5,949,683 A | | 9/1999 | Akami et al. |
| 5,989,643 A | | 11/1999 | Nakagawa et al. |
| 6,208,104 B1 | | 3/2001 | Onoue et al. |
| 6,325,302 B1 | | 12/2001 | Guzowski et al. |
| 6,472,838 B1 | | 10/2002 | Shikazono et al. |
| 6,776,843 B2 | | 8/2004 | Fouvet et al. |
| 7,429,298 B2 | * | 9/2008 | Krogedal et al. ............. 118/323 |
| 2003/0045967 A1 | * | 3/2003 | Milojevic et al. ............. 700/245 |

FOREIGN PATENT DOCUMENTS

| | | |
|---|---|---|
| EP | 0710157 | 10/1998 |
| JP | S58-22688 A | 2/1983 |
| JP | 59134681 | 8/1984 |
| JP | 60-5470 U | 1/1985 |
| JP | S61-201788 UM | 12/1986 |
| JP | 62-188383 U | 11/1987 |
| JP | 62294459 | 12/1987 |
| JP | S63-191587 A | 8/1988 |
| JP | 1194959 | 8/1989 |
| JP | 02-48286 A | 2/1990 |
| JP | H2-66262 U | 5/1990 |
| JP | 02-198778 A | 8/1990 |
| JP | 2251276 | 10/1990 |
| JP | 2145985 U | 12/1990 |
| JP | 4022475 | 1/1992 |
| JP | 6312385 | 11/1994 |
| JP | 8164349 | 6/1996 |
| JP | 8229493 | 9/1996 |
| JP | 10080109 | 3/1998 |
| JP | 10138190 | 5/1998 |
| JP | 10192750 | 7/1998 |
| JP | 10202577 | 8/1998 |
| JP | 11057553 | 3/1999 |
| JP | 11057553 A | 3/1999 |
| JP | 11-104533 | 4/1999 |
| JP | 2000141253 | 5/2000 |
| JP | 2000167451 | 6/2000 |
| JP | 2003144990 | 5/2003 |
| WO | WO9503133 A1 | 2/1995 |
| WO | WO03035275 | 5/2003 |

OTHER PUBLICATIONS

Commissioner for Patents, Request for Ex Parte Reexamination Pursuant to 37 CRF § 1.510, U.S. Patent No. 7,429,298, Inventors: Arnulf Krogedal, et al. Issued: Sep. 30, 2008, Mailed: May 9, 2012.

* cited by examiner

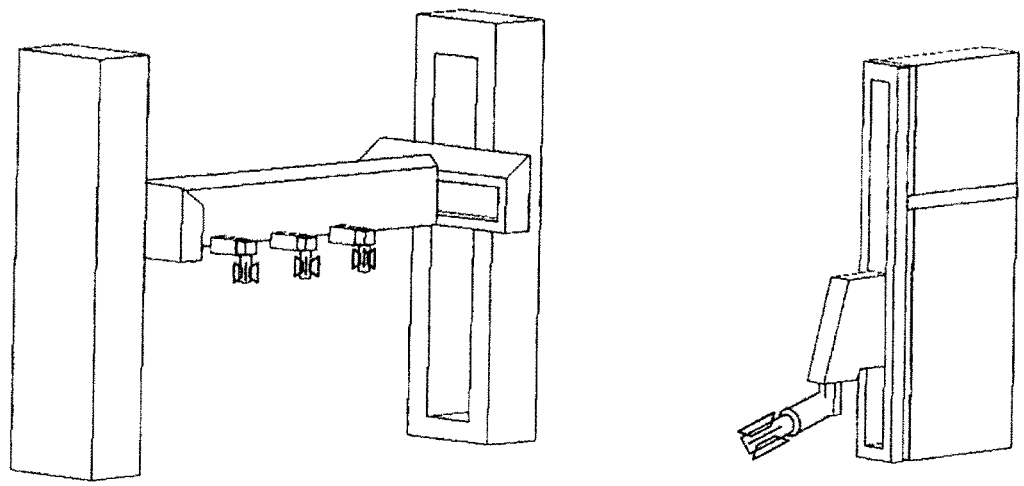
Fig 1 Prior Art
Fig 2 Prior Art
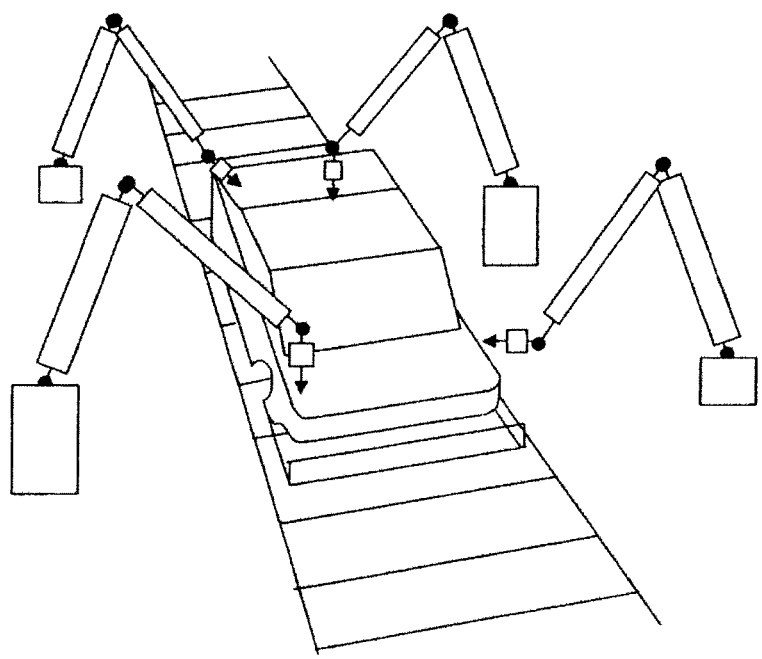
Fig 3 Prior Art

PAINTING SYSTEM HAVING A WALL-MOUNTED ROBOT

CROSS-REFERENCE TO RELATED APPLICATION

This application is a divisional patent application of, and claims priority from, U.S. patent application Ser. No. 10/893,222, filed on Jul. 19, 2004, now U.S. Pat. No. 7,429,298, which claims the benefit of U.S. Provisional Application No. 60/487,940, filed on Jul. 18, 2003, each of which is hereby incorporated by reference in its entirety.

BACKGROUND OF THE INVENTION

The present invention concerns a painting system comprising a paint booth and a robot installation for painting large objects inside the painting booth. More particularly, the invention concerns such a painting system including a paint booth with walls isolating the object to be painted from the surroundings. Still more particularly, the invention concerns such a system wherein the robot installation contains an industrial robot having at least four axes for servo-controlled movement. An industrial robot in this context comprises a manipulator with electric motors and a control means containing power means for driving the motors and a computer that performs instructions of a computer program to sense and control the manipulator movements.

Painting of car bodies on an industrial scale usually takes place in a painting booth, through which the car bodies are moved on a conveyor in a line succession. For example painting of car bodies in such booths, simple type of hard automation solutions as reciprocators or the like are used. Apparatus of this type may have a sufficient range of reciprocal motion in the vertical direction, but have rather limited ranges of motion in the transverse direction of the painting booth, and practically no option for tracking the object to be painted in the direction of the conveyor motion through the booth. Several such reciprocators having overlapping working ranges along the length of direction of the booth must then be used to maintain a reasonable conveyor speed and paint coverage. A typical representation of prior art machines of this type are shown in FIGS. 1 and 2.

In order to obtain an optimal and uniform layer of paint and an optimum painting quality, the paint must be sprayed from the painting tool in a controlled manner normal (perpendicular) to the surface to be covered. The motion pattern of the painting tool must then be correspondingly programmed in relation to the curved surfaces and edges of the car body. This can only be accomplished by means of flexible solution including a plurality of industrial robots. The robot can easily adapt the paint tool to the optimal path pattern for the different car models, which are produced/painted in the same production line. Such robot solution must then be located in the paint booth itself, which requires considerably wider booths than would be needed in an optimal production line. A typical view of a prior art paint booth with a plurality of industrial robots for painting a large object is shown in FIG. 3. Another painting apparatus of this kind is known from U.S. Pat. No. 4,714,044.

From U.S. Pat. No. 4,630,567 a spray paint system including a paint booth is previously known. The system comprises two painting robots that are moveable on rails along a car body in the direction of the conveyor movement of a car stream. The known system discloses a booth with wall defining the enclosed painting area and at least one painting robot located inside this painting area. The painting robot is moveably supported on a track means outside of the painting area. Track means comprising rails however are costly and very delicate in function on dirt and particles on the rails. Thus, it is difficult to keep track of the robot position on the rails.

Still all of the known painting systems use a plurality of manipulators on each side of the car body to fully cover the whole area to be painted. The more manipulators inside the painting booth necessary for painting the object the higher the investment costs. A larger number of manipulators to be controlled to simultaneously paint the object normally results in a very complex software programming.

A commonly known upright mounted industrial robot has a stand rotatably arranged around a vertical axis. The stand carries a lower arm rotatably arranged around a horizontal axis and the lower arm carries an upper arm also rotatably arranged around a horizontal axis. In order to reach full operational capacity, the robot needs a clearance between the robot and the back wall to permit the maneuvering of the lower arm. On the other hand, the paint booth itself must be as small as possible. Thus, there is a conflict of demands. The robot needs more space and the booth must be restricted in volume. One way to handle this situation is to arrange a plurality of robots arranged with overlapping operation areas and so operating that the lower arm never swings backwards. Thus, in such systems there is no need for a maneuvering space behind the robot. This arrangement of course affects the performance of the robot. The robot then is only capable of making short paint strokes. An increased number of short paint strokes calls for an increased number of time-consuming re-orientation operations and severe waste of paint.

Consequently, there is a need within the industry of car manufacture to decrease the space demands for a paint booth and still increase the operation capacity of the painting robots to maintain or even increase the production volume.

SUMMARY OF THE INVENTION

In accordance with the present invention, a painting system for painting large objects is provided. The painting system includes a paint booth with a first wall and a painting robot having a stationary base mounted to the first wall. The stationary base may be mounted to the first wall and positioned so that a first axis of the painting robot is arranged at a non-perpendicular angle relative to the painting booth first wall or floor. A stand is mounted to the stationary base and is rotatable around the first axis. A first arm is rotatably mounted to the stand around a second axis. A second arm is rotatably mounted to the first arm around a third axis. The third axis is parallel to the second axis. The second arm is operable to rotate around the third axis 180 degrees relative to the first arm. An end effector is connected between the second arm and a painting tool. The end effector is operable to orient the painting tool. The first axis is generally non-vertical and more particularly substantially horizontal. The stand is mounted to the first wall in cantilever fashion.

BRIEF DESCRIPTION OF THE DRAWINGS

The features, aspects, and advantages of the present invention will become better understood with regard to the following description, appended claims, and accompanying drawings where:

FIG. 1 is a prior art painting manipulator with two stationary stands carrying a movable horizontal beam with spray guns, FIG. 2 is a prior art single sided painting manipulator with a moveable arm carrying a spray gun, FIG. 3 is a prior art painting manipulator arrangement with four stationary upright mounted industrial robots with spray guns.

DETAILED DESCRIPTION OF ILLUSTRATIVE EMBODIMENTS

Figure 4:
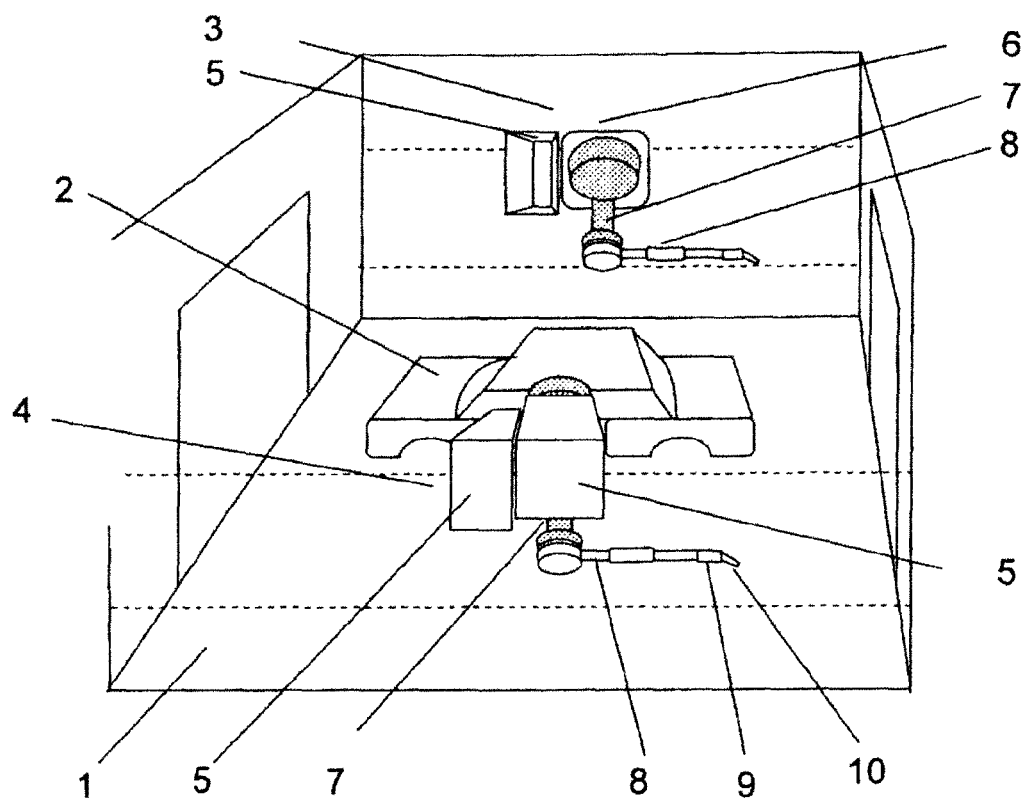
FIG. 4 is a three dimensional view of a painting system according to the invention with two wall mounted industrial robots with spray guns in a paint booth.

It should be noted that in the detailed description that follows, identical components have the same reference numerals, regardless of whether they are shown in different embodiments of the present invention. It should also be noted that in order to clearly and concisely disclose the present invention, the drawings may not necessarily be to scale and certain features of the invention may be shown in somewhat schematic form.

Figure 5:
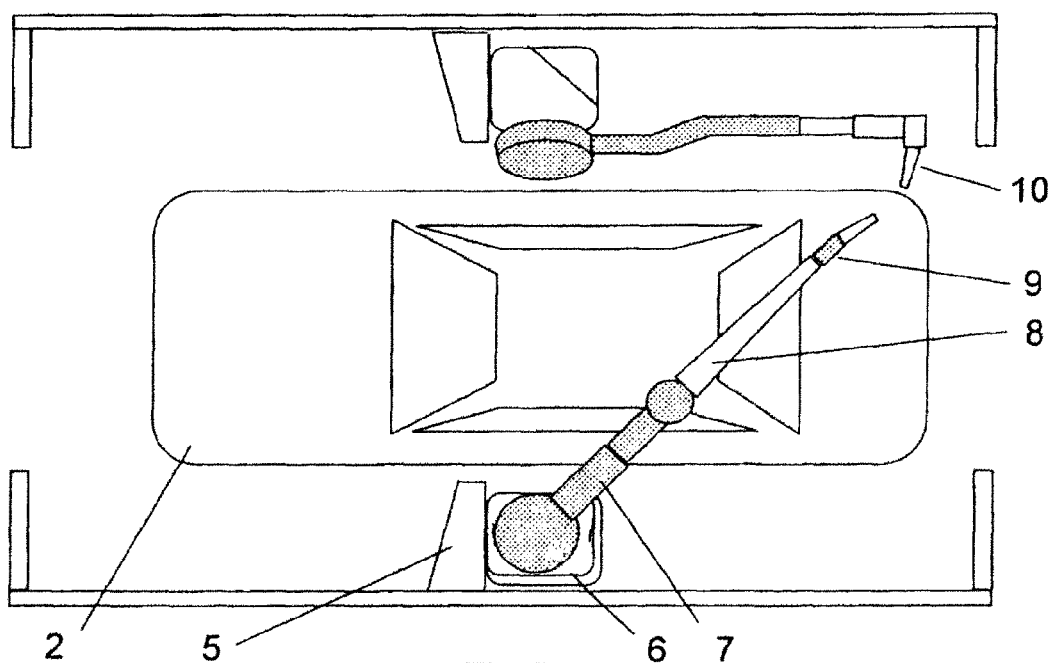
FIG. 5 is a second three dimensional view of a painting system from above according to the invention where the reach of the robots is indicated.

According to FIG. 4, a painting system according to the invention comprises a painting booth 1, in which is placed an object, a car body 2 to be painted. The booth also comprises a first painting robot 3 and a second painting robot 3. Each of the painting robots comprises a base 5 attached to the wall of the booth. The base comprises a cantilever construction and carries a stand 6 rotatably arranged around a first axis, which in the embodiment shown is oriented in the direction of the length of the booth. As shown in FIG. 5, the first axis is spaced inwardly from the wall to which the painting robot 3 is attached. The stand carries a first arm 7 rotatably arranged around a second axis, which in the embodiment shown is oriented normal to the first axis. The first arm carries a second arm 8 rotatably arranged around a third axis, which in the embodiment shown is oriented parallel to the second axis. The second arm carries an end effector comprising an arm part arrangement 9 with three degrees of freedom moveability. Finally, the end effector arrangement caries a painting tool 10 in the form of one or several spray gun(s)/applicator(s).

The painting system is presented in another view in FIG. 5 where the same parts have the same numbers as in FIG. 4. While the painting robots in FIG. 4 are held in a home position to give full accessibility to the booth, the robots in FIG. 5 are shown in an operation position. From the figure, the flexibility of the possible movement of the two painting robots is clearly viewable.

Figure 6:
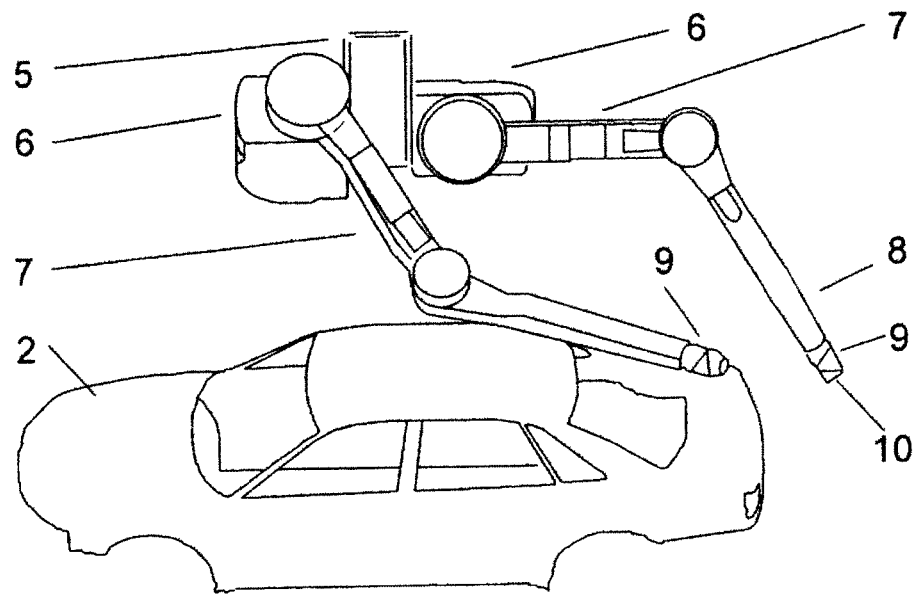
FIG. 6 is a side perspective view of a second embodiment of a painting system according to the invention with two stationary industrial robots with spray guns mounted on the same wall in a paint booth.
Figure 7:
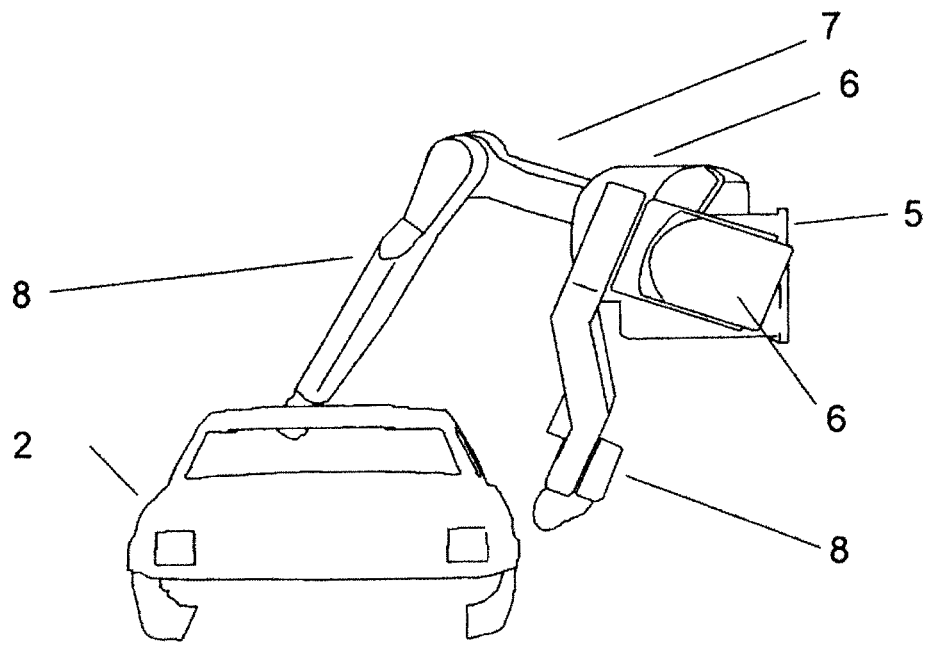
FIG. 7 is an end view of the second embodiment of the painting system.

A second embodiment of the present invention is shown in FIGS. 6 and 7 where FIG. 6 shows a side perspective view of the paint booth and where FIG. 7 shows an end view of the paint booth. In the second embodiment, the two painting robots are mounted on the same base 5 attached to the wall. Again, the two robots have the same configuration as in the previous embodiment in FIGS. 4 and 5. Thus, each painting robot has a stand 6 carried by the base 5 and rotatably arranged around a first axis. The stand carries a first arm 7 rotatably arranged around a second axis, which in the embodiment shown is oriented normal to the first axis. The first arm carries a second arm 8 rotatably arranged around a third axis, which in the embodiment shown is oriented parallel to the second axis. The second arm carries an end effector comprising an arm part arrangement 9 with three degrees of freedom moveability. Finally, the end effector arrangement carries a painting tool 10 in the form of a spray gun.

The invention must not be restricted to the embodiment shown. Thus, within the inventive concept there is to be understood that a third painting robot of the same kind could be installed in the booth in order to increase production capacity or for painting very big objects. It is also within the inventive concept to include a controlling means to control the two robots in their painting operation.

In FIG. 4, the robot arm 7 that rotates around the second axis is depicted as a straight arm. In FIGS. 5 and 6 it is shown that the robot arm 7 that rotates around the second axis may be a bent structure or cranked. It can be seen from FIG. 6 that by arranging each of the second and third axis arms in a cranked (bent) form, it is possible for the second arm 8 to rotate around the third axis a full 360° relative to the first arm 7.

Figure 8:
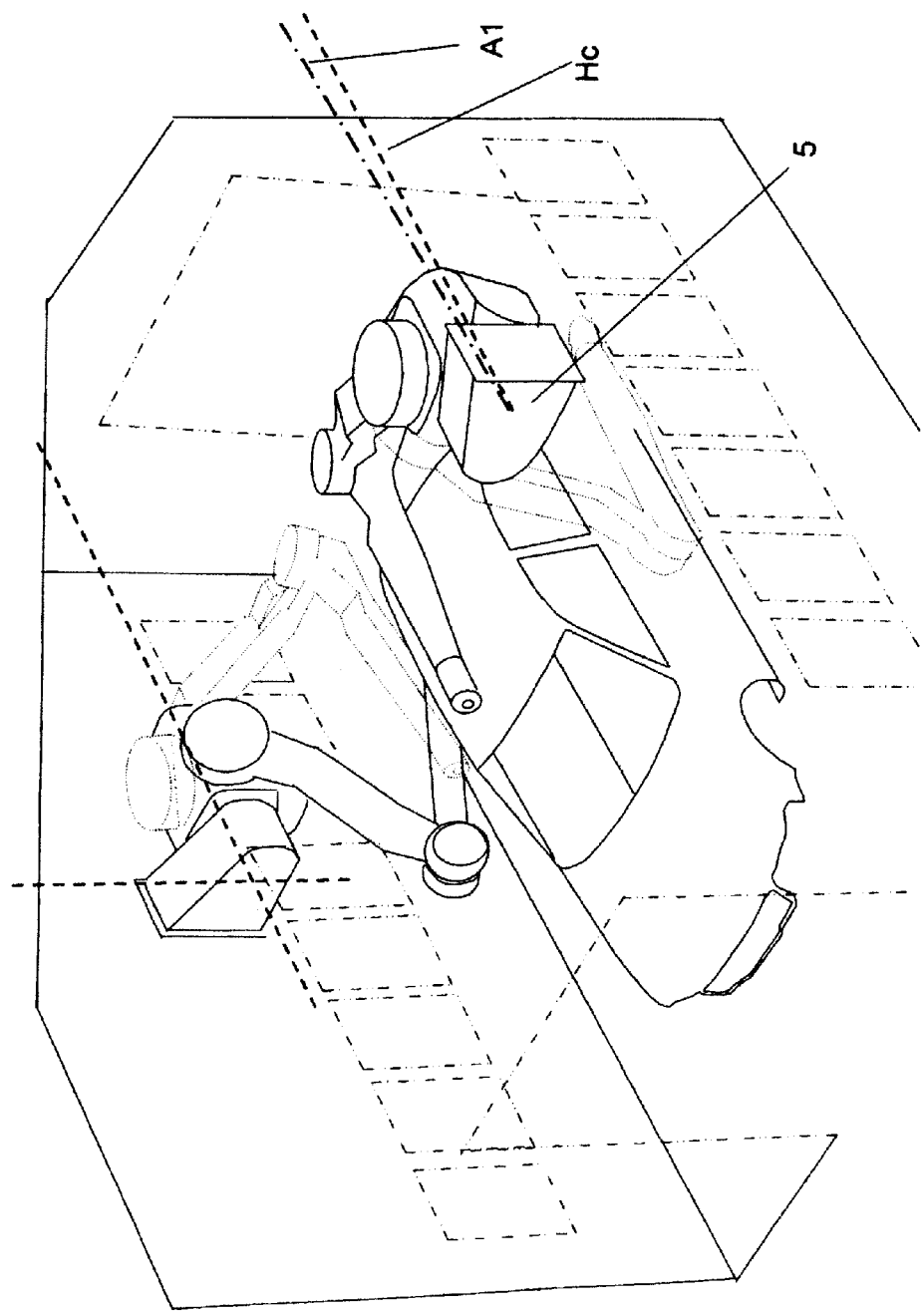
FIG. 8 is a perspective view of a third embodiment of a painting system according to the invention.

FIG. 8 shows a further embodiment in which the base 5 of one or more of the robots may be constructed or so mounted that the first axis in FIG. 4 can be arranged at a different, non perpendicular angle relative to the wall and/or floor to obtain optimal accessibility to both side and top parts of the car bodies. For example the base 5 may be mounted so that the first axis is at a combination of 30 degrees angled relative to horizontal and 10 degrees relative to the vertical, that is relative to the booth wall, as well as other combinations in order to obtain an optimal path movement of the spray gun towards the object/car body.

FIG. 8 shows two robots 3 directly mounted on opposite walls of the booth. Each robot is mounted with the first axis, A1, lying in a horizontal plane, however the base 5 may be mounted such that the first axis is not parallel to the direction of the conveyor Hc and/or not perpendicular to the wall. The arms of the robot on the far wall are shown arranged in each of two relatively extreme positions for spraying low or high along the side of the object, and the arms of the robot on the near wall are shown arranged in each of two positions for spraying high, front of object or low, back of object. It may be seen from FIG. 8 that each robot 3 can cover the object efficiently by means of horizontal strokes directed over a large part of the object when the robot is mounted on the wall in this orientation to the object. The object may be painted with strokes longer than half the length of the object to be painted. At least one stroke may be equal to the length of the object.

As previously described, the base 5 is attached to the wall of the booth. In a preferred embodiment, the robot base 5 is so constructed that the interior of the base may be accessed for maintenance and control purposes from outside of the paint booth. Access through the wall of the paint booth, so as to speak, provides access to, for example, control and diagnostic functions in the base 5 of the robot, as well as, for example, to some mechanical, electrical and electronic components of the robot. Access from outside of the booth via a suitable hatch, cover or window confers tremendous advantages because entry by a technician into the paint booth is no longer required for typical diagnostic and/or maintenance operations. Thus, some diagnostic, control and/or maintenance operations may be carried out for robots according to the preferred embodiment while the paint booth is still in operation, operations that are usually impossible or too dangerous to carry out.

It should also be appreciated that each painting robot 3 may include a plurality of connected cavities enclosing electric motors, power- and signal cables arranged for the movement of the robot 3. A non-ignitable gas, such as an inert gas, nitrogen, or any other nonflammable gas or a mixture of such gases may be maintained under an overpressure throughout the inter-connected cavities.

Normally the two painting robots in the booth are each arranged for painting half of an object. This implies that the two arms of each robot must together reach all positions of each halves of the object. Thus the minimum length of the first and the second arm together must be longer than half the length of the object. Since the first and second arms must be able to fold upon each other they are in a preferred embodiment equal in length. Thus with this configuration the length of each arm must be equal or longer than a fourth of the length of the object to be painted.

It is to be understood that the description of the foregoing exemplary embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A painting system for painting large objects, comprising:
a paint booth comprising a first wall; and
a painting robot comprising:
a stationary base mounted to the first wall and positioned so that a first axis of said painting robot is arranged at a non-perpendicular angle relative to said painting booth first wall;
a stand mounted to the stationary base, and rotatable around said non-perpendicular first axis;
a first arm rotatably mounted to the stand around a second axis; a second arm rotatably mounted to the first arm around a third axis, the second arm being operable to rotate around the third axis 180 degrees relative to the first arm and wherein the third axis is parallel to the second axis;
a painting tool; and
an end effector connected between the second arm and the painting tool, the end effector being operable to orient the painting tool.

2. The painting system according to claim 1, wherein the end effector has three degrees of freedom of movement.

3. The painting system according to claim 1, wherein the stationary base of the painting robot is mounted at a level above the object to be painted.

4. The painting system of claim 3, wherein the stationary base of the painting robot is mounted on the first wall in a cantilever manner such that the first axis of the painting robot is spaced inwardly from the first wall.

5. The painting system of claim 1, wherein the second arm is operable to rotate around the third axis 360 degrees relative to the first arm.

6. The painting system of claim 5, wherein the first and second arms are each bent.

7. The painting system according to claim 1, wherein the second axis is perpendicular to the first axis.

8. The painting system according to claim 1, wherein an interior of the stationary base is accessible from outside the paint booth, through the first wall.

9. The painting system according to claim 1, wherein the first axis extends in the direction of the length of the paint booth.

10. The painting system according to claim 1, wherein the paint booth further comprises a second wall disposed opposite of the first wall, and wherein the painting system further comprises:
a second painting robot comprising:
a stationary base mounted to the second wall;
a stand mounted to the stationary base and rotatable around a substantially horizontal first axis;
a first arm rotatably mounted to the stand around a second axis;
a second arm rotatably mounted to the first arm around a third axis, the second arm being operable to rotate around the third axis 180 degrees relative to the first arm;
a painting tool; and
an end effector connected between the second arm and the painting tool, the end effector being operable to orient the painting tool.

11. A painting system for painting large objects, comprising:
a paint booth comprising a first wall and a floor; and
a painting robot comprising:
a stationary base mounted in a cantilever fashion to the first wall and positioned so that a first axis of said painting robot is arranged at a non-perpendicular angle relative to the painting booth floor;
a stand mounted to the stationary base and rotatable around said non-perpendicular first axis;
a first arm rotatably mounted to the stand around a second axis;
a second arm rotatably mounted to the first arm around a third axis, the second arm being operable to rotate around the third axis 180 degrees relative to the first arm and wherein the third axis is parallel to the second axis;
a painting tool; and
an end effector connected between the second arm and the painting tool, the end effector being operable to orient the painting tool.

12. The painting system of claim 11, wherein the second arm is operable to rotate around the third axis 360 degrees relative to the first arm.

13. The painting system of claim 11, wherein the stationary base is mounted to the first wall, above the object.

14. The painting system of claim 11, wherein the painting robot comprises a plurality of connected cavities enclosing equipment arranged to move the painting robot, the cavities containing a non-ignitable gas.

15. The painting system according to claim 11, wherein an interior of the stationary base is accessible from outside the paint booth, through the first wall.

* * * * *